United States Patent
Wu et al.

(10) Patent No.: US 10,081,752 B2
(45) Date of Patent: *Sep. 25, 2018

(54) MULTIFUNCTIONAL SLICK WATER CONCENTRATE INTEGRATING PROPERTIES OF DRAG REDUCER, FLOW BACK SURFACTANT AND CLAY STABILIZER

(71) Applicant: Yangtze University, Jingzhou (CN)

(72) Inventors: Jun Wu, Houston, TX (US); Wei-Chu Yu, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,725

(22) Filed: Oct. 24, 2017

(65) Prior Publication Data
US 2018/0112117 A1   Apr. 26, 2018

(30) Foreign Application Priority Data

Oct. 25, 2016 (CN) .......................... 2016 1 0934386

(51) Int. Cl.
| | | |
|---|---|---|
| *C09K 8/05* | (2006.01) | |
| *B01F 17/00* | (2006.01) | |
| *C09K 8/584* | (2006.01) | |
| *C09K 8/88* | (2006.01) | |
| *C11D 1/00* | (2006.01) | |
| *C08F 2/06* | (2006.01) | |

(52) U.S. Cl.
CPC ............ *C09K 8/05* (2013.01); *B01F 17/0035* (2013.01); *C08F 2/06* (2013.01); *C09K 8/584* (2013.01); *C09K 8/882* (2013.01); *C11D 1/004* (2013.01); *C09K 2208/12* (2013.01); *C09K 2208/28* (2013.01)

(58) Field of Classification Search
CPC ........ B01F 17/0035; C08F 2/06; C09K 8/584; C09K 8/882; C09K 2208/12; C09K 2208/28; C09K 8/05
See application file for complete search history.

(56) References Cited

U.S. PATENT DOCUMENTS

2009/0221453 A1* 9/2009 Mukhopadhyay ....... C09K 8/68
507/202

* cited by examiner

*Primary Examiner* — Zakiya W Bates
*Assistant Examiner* — Crystal J Miller
(74) *Attorney, Agent, or Firm* — Hemisphere Law, PLLC; Zhigang Ma

(57) ABSTRACT

A multifunctional slick water concentrate, is obtained by "W/W" dispersion polymerization at elevated temperature, wherein water-soluble monomer A1, water-soluble fluorocarbon surfactant A2, water-soluble quaternary ammonium clay stabilizer A3, water-soluble dispersant A4, water-soluble free radical initiator A5, inorganic salt A6 and water A7, is first formed a homogeneous system under mechanical agitation; wherein, the percentage of the weight of each respective component, relative to the total weight of the reaction system, is as the following: water-soluble monomer A1: 5.0-20.0%; water-soluble fluorocarbon surfactant agent A2: 0.1-5.0%; water-soluble quaternary ammonium clay stabilizer A3: 0.1-20.0%; water-soluble dispersant A4: 0.1-10.0%; water-soluble radical initiator A5: 0.000001-0.100%; inorganic salt A6: 15.0-40.0%; water A7: remainder.

8 Claims, No Drawings

MULTIFUNCTIONAL SLICK WATER CONCENTRATE INTEGRATING PROPERTIES OF DRAG REDUCER, FLOW BACK SURFACTANT AND CLAY STABILIZER

BACKGROUND OF THE INVENTION

1. Field of the Invention

The present invention relates to a multifunctional slick water concentrate, especially relates to a multifunctional slick water concentrate integrating the properties of drag reducer, flow back surfactant and clay stabilizer.

2. Description of Related Arts

With the extensive shale oil and gas exploration and development, slick water fracking with the aim to improve reservoir permeability receives more and more attention. Slick water refers to a fluid, where small amounts of drag reducing agent, flow back surfactant and clay stabilizer are added to fresh or saline water. In the fracturing process, the high-pressure fluid quickly penetrates the ground, fracking the reservoir with enhanced hydrocarbon productivity being the result.

At slick water fracking well site, a plurality of various classes of chemical agents include drag reducer, flow back surfactant and clay stabilizer are stored concurrently. These different chemicals may be solid or liquid, respectively, and transported under various forms of packaging to the site before fracturing takes place. Liquids are normally stored in tanks, whereas the solids are often stored in dedicated areas with appropriate rain-proof and safety measures in place. These chemicals are to be comingled in a common blending device, before the resultant slick water is to be pumped downhole for fracking.

Shale oil and gas fields are often in locations such as mountainous areas with limited communications, transportation and accessibility. The fact that varieties of these chemicals have to be comingled before fracking compels many problems: 1) shipping a variety of chemicals to mountainous area is not convenient and leads to increased transportation costs and risks; 2) the use of multiple tanks and designated areas for incompatible chemicals occupies a lot of precious space; 3) the use of multiple pipes, pressure manifolds and blending device demands a lot of manpower and resources, increasing security risks and operation errors. Thus, the development of a slick water concentrate with integrated properties of drag reduction, water flow back and clay stabilization is highly sought after by professionals working in shale exploration and production.

SUMMARY OF THE INVENTION

A multifunctional slick water concentrate, is obtained by "W/W" dispersion polymerization at elevated temperature, wherein water-soluble monomer A1, water-soluble fluorocarbon surfactant A2, water-soluble quaternary ammonium clay stabilizer A3, water-soluble dispersant A4, water-soluble free radical initiator A5, inorganic salt A6 and water A7, is first formed a homogeneous solution under mechanical agitation; wherein, the percentage of the weight of each respective component, relative to the total weight of the slick water concentrate, is as the following: water-soluble monomer A1: 5.0-20.0%; water-soluble fluorocarbon surfactant agent A2: 0.1-5.0%; water-soluble quaternary ammonium clay stabilizer A3: 0.1-20.0%; water-soluble dispersant A4: 0.1-10.0%; water-soluble radical initiator A5: 0.000001-0.100%; inorganic salt A6: 15.0-40.0%; water A7: remainder.

The present invention is advantageous in that synergies and multiple properties including drag reduction, water flow back and clay stabilization coexist in one concentration solution. The extent of drag reduction can reach over 70% during hydraulic fracturing. Meanwhile, the introduction of fluorocarbon surfactant and quaternary ammonium clay stabilizer creates synergies with the surface tension as low as below 30 mN/m, the interfacial tension being 0.1 mN/m or less, and clay-swelling prevention of greater than 70%. As a slick water concentrate, it requires only a tank, a pipeline and a pump during on-site operation by dosing 0.01 to 1.0% of the concentrate to fresh or saline water.

DETAILED DESCRIPTION OF THE INVENTION

The following specific embodiments in conjunction with the present invention will be further described in the preparation of 100.0 kg of the slick water concentrate with drag reduction, flow back enhancement and clay stabilization functions.

This concentrate is prepared by, introducing a small amount of water-soluble high-performance small or large molecule clay stabilizer containing no carbon-carbon double bond and a fluorocarbon surfactant (to reduce interfacial tension or IFT) containing no carbon-carbon double bond, to the aqueous phase for dissolving water-soluble monomer during "water-in-water" "W/W" dispersion polymerization for obtaining a drag reducer. Both the fluorocarbon surfactant and quaternary ammonium clay stabilizer contain no carbon-carbon double bond, and therefore do not participate the polymerization process. The "water-in-water" dispersion drag reducing agent may be an ordinary water-soluble polymer drag reducing agent or it may also be a low-damaging friction reducer with minimized friction coefficient between the molecules and between the molecules and the pay zone. These low-damaging drag reducers may be modified by the utilization of hydrophobic or fluorocarbon moieties.

The multifunctional slick water concentrate integrating the properties of drag reducer, flow back surfactant and clay stabilizer, is obtained by "W/W" dispersion polymerization at elevated temperature, wherein water-soluble monomer A1, water-soluble fluorocarbon surfactant A2, water-soluble quaternary ammonium clay stabilizer A3, water-soluble dispersant A4, water-soluble free radical initiator A5, inorganic salt A6 and water A7, is first formed a homogeneous solution under mechanical agitation; wherein, the percentage of the weight of each respective component, relative to the total weight of the reaction system slick water concentrate, is as the following: water-soluble monomer A1: 5.0-20.0%; water-soluble fluorocarbon surfactant agent A2: 0.1-5.0%; water-soluble quaternary ammonium clay stabilizer A3: 0.1-20.0%; water-soluble dispersant A4: 0.1-10.0%; water-soluble radical initiator A5: 0.000001-0.100%; inorganic salt A6: 15.0-40.0%; water A7: remainder.

The water-soluble monomer A1 is the water-soluble monomer selected from one or more of the group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyl diallyl ammonium chloride,

[2-(methacryloyloxy)ethyl]trimethylammonium chloride, [2-(acryloyloxy)ethyl]trimethylammonium chloride; (3-acrylamidopropyl)trimethylammonium chloride, [3-(methacryloylamino)propyl]trimethylammonium chloride, acryloxyethyldimethylbenzyl ammonium chloride, methacryloxyethyldimethylbenzyl ammonium chloride, acrylic acid, sodium acrylate, potassium acrylate, methacrylic acid, sodium methacrylate, potassium methacrylate, 2-acrylamido-2-methylpropanesulfonic acid, 2-acrylamido-2-methylpropane sulfonate sodium salt, and 2-acrylamido-2-methyl propane sulfonic acid potassium salt.

The water-soluble fluorocarbon surfactant A2 is one or more of the surfactants selected from the group consisting of water-soluble anionic fluorocarbon surfactants, water-soluble cationic fluorocarbon surfactant, water-soluble nonionic fluorocarbon surfactant, water-soluble zwitterionic fluorocarbon surfactant, and water-soluble Gemini fluorocarbon surfactant, including perfluorooctanoic acid, lithium perfluorooctanate, sodium perfluorooctanate, potassium perfluorooctanate, ammonium perfluorooctanate, perfluorooctane sulfonic acid, lithium perfluorooctane sulfonate, sodium perfluorooctane sulfonate, and potassium perfluorooctane sulfonate.

The water-soluble quaternary ammonium clay stabilizer A3 is one or more of the quaternary ammonium salts selected from the group consisting of water-soluble quaternary ammonium salt including tetramethylammonium chloride, choline chloride, butyl trimethylammonium chloride, octyl trimethyl ammonium chloride, dodecyl trimethyl ammonium chloride, cetyl trimethyl ammonium chloride, and poly(dimethyl diallyl ammonium chloride).

The water-soluble dispersing agent A4 is one or more of the dispersants selected from water-soluble dispersants including poly{[2-(methacryloyloxy)ethyl]trimethylammonium chloride}, poly{[2-(acryloyloxy)ethyl]trimethylammonium chloride}, poly(vinyl benzyl trimethyl ammonium chloride), poly(dimethyl diallyl ammonium chloride), hydrolyzed polyacrylamide and hydrolyzed poly(vinyl acetate).

The water-soluble free radical initiator A5 is one or more of initiators selected from the group consisting of water-soluble initiators including ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, 4,4'-azobis(4-cyanovaleric acid).

The inorganic salt A6 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

The above-described drag reducing agent is prepared by using water-soluble monomers exclusively. Further, the drag reducing agents may be water-soluble macromolecules modified with hydrophobic or fluorocarbon moieties. Based on the technical solutions described above, mutual solvent A8 and hydrophobic monomer A9, or mutual solvent A8 and fluorinated monomer A10, can be introduced to the original homogenous aqueous solution, before the subsequent dispersion polymerization takes place at elevated temperature under mechanical agitation. Thus, the resultant polymer chains possess hydrophobic or fluorocarbon moieties on its backbone to minimize intermolecular and molecular-reservoir friction coefficient.

The mutual solvent A8 is one or more of the mutual solvents selected from the group consisting of mutual solvents including ethylene glycol monobutyl ether, dimethyl formamide, and alcohol derivatives, aldehyde derivatives, ketone derivatives, ether derivatives and other derivatives of dimethyl sulfoxide;

The hydrophobic monomer A9 is one or more of hydrophobic monomers selected from the group of hydrophobic monomers comprising methyl acrylate, methyl methacrylate, ethyl acrylate, ethyl methacrylate, propyl acrylate, propyl methacrylate, butyl acrylate, butyl methacrylate, and styrene;

The fluorocarbon monomer A10 is one or more of the fluorocarbon monomers selected from the group of fluorocarbon monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, perfluorodecyl acrylate.

Example 1

The weight percentages of water-soluble monomer A1, water-soluble fluorocarbon surfactant A2, water-soluble quaternary ammonium clay stabilizer A3, water-soluble dispersant A4, water-soluble radical initiator A5, inorganic salt A6 and water A7, are as the flowing: water-soluble monomer A1 acrylamide, 4.0 kg; sodium acrylate, 3.0 kg; water-soluble fluorocarbon surfactant A2: sodium perfluorooctanoate, 0.5 kg; water-soluble quaternary ammonium clay stabilizer A3: choline chloride, 5.0 kg; water-soluble dispersant A4: poly(2-acrylamido-2-methylpropane sulfonate), 1.0 kg; water-soluble radical initiator A5: ammonium persulfate, 0.0010 kg; inorganic salt A6: sodium chloride, 5.0 kg; ammonium sulfate, 15.0 kg; water A7: water, 66.499 kg.

The above-mentioned water-soluble monomer A1, water-soluble fluorocarbon surfactant A2, water-soluble quaternary ammonium clay stabilizer A3, water-soluble dispersant A4, water-soluble free radical initiator A5, inorganic salt A6, and water A7 are first homogenized under mechanical stirring. The solution is then warmed to 60-80° C. to initiate dispersion polymerization for obtaining multi-functional slick water concentrate.

Example 2

The weight percentages of water-soluble monomer A1, water-soluble fluorocarbon surfactant A2, water-soluble quaternary ammonium clay stabilizer A3, water-soluble dispersant A4, water-soluble radical initiator A5, inorganic salt A6, mutual solvents A8, hydrophobic monomer A9 and water A7, are as the flowing: water-soluble monomer A1: acrylamide, 3.0 kg; sodium acrylate, 3.0 kg; water-soluble fluorocarbon surfactant A2: sodium perfluorooctanoate, 0.5 kg; water-soluble quaternary ammonium clay stabilizer A3: choline chloride, 8.0 kg; water-soluble dispersant A4: poly(2-acrylamido-2-methylpropane sulfonate), 1.0 kg; water-soluble radical initiator A5: ammonium persulfate, 0.0010 kg; inorganic salts A6: sodium chloride, 5.0 kg; ammonium sulfate, 15.0 kg; mutual solvent A8: ethylene glycol monobutyl ether, 10.0 kg; hydrophobic monomer A9: methyl acrylate, 0.20 kg; water A7: water, 54.299 kg.

The above-mentioned water-soluble monomer A1, water-soluble fluorocarbon surfactant A2, water-soluble quaternary ammonium clay stabilizer A3, water-soluble dispersant A4, water-soluble free radical initiator A5, inorganic salt A6, mutual solvent A8, hydrophobic monomer A9 is first dissolved in water A7 under mechanical stirring. The solution is then allowed to warm to 60-80° C. to start dispersion polymerization for obtaining a slick water concentrate with integrated properties of drag reduction, clay stabilization and water flow back.

Example 3

The weight percentages of water-soluble monomer A1, water-soluble fluorocarbon surfactant A2, water-soluble quaternary ammonium clay stabilizer A3, water-soluble dispersant A4, water-soluble radical initiator A5, inorganic salt A6, mutual solvents A8, a fluorocarbon-containing monomer A10 and water A7, are as the flowing: water-soluble monomer A1: acrylamide, 3.0 kg; sodium acrylate, 3.0 kg; water-soluble fluorocarbon surfactant A2: sodium perfluorooctanoate, 0.50 kg; water-soluble quaternary ammonium clay stabilizer A3: choline chloride, 8.0 kg; water-soluble dispersant A4: poly(2-acrylamido-2-methylpropane sulfonate), 1.0 kg; water-soluble radical initiator A5: ammonium persulfate, 0.0010 kg; inorganic salt A6: sodium chloride, 5.0 kg; ammonium sulfate, 15.0 kg; mutual solvent A8: ethylene glycol monobutyl ether, 10.0 kg; fluorocarbon monomer A10: perfluorodecyl acrylate, 0.20 kg; water A7: water, 54.299 kg.

The above-mentioned water-soluble monomer A1, water-soluble fluorocarbon surfactant A2, water-soluble quaternary ammonium clay stabilizer A3, water-soluble dispersant A4, water-soluble free radical initiator A5, inorganic salt A6, mutual solvent A8, fluorocarbon monomer A10 is first dissolved in water A7 under mechanical stirring. The solution is then allowed to warm to 60-80° C. to start dispersion polymerization for obtaining a slick water concentrate with integrated properties of drag reduction, clay stabilization and water flow back.

The present invention is advantageous in that synergies and multiple properties including drag reduction, water flow back and clay stabilization coexist in one concentration solution. The extent of drag reduction can reach over 70% during hydraulic fracturing. Meanwhile, the introduction of fluorocarbon surfactant and quaternary ammonium clay stabilizer creates synergies with the surface tension as low as below 30 mN/m, the interfacial tension being 0.1 mN/m or less, and clay-swelling prevention of greater than 70%. As a slick water concentrate, it requires only a tank, a pipeline and a pump during on-site operation by dosing 0.01 to 1.0% of the concentrate to fresh or saline water.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-functional slick water concentrate, obtained by dispersion polymerization at elevated temperature; wherein the multi-functional slick water concentrate comprises a water-soluble monomer A1, a water-soluble fluorocarbon surfactant A2, a water-soluble quaternary ammonium salt clay stabilizer A3, a water-soluble dispersant A4, a water-soluble free radical initiator A5, an inorganic salt A6 and water A7, which is used as solvent, are first homogenized under mechanical stirring, before being heated to reaction temperature; wherein the weight percentages of each component with respect to the total weight of the multi-functional slick water concentrate are as the following: the water-soluble monomer A1: 5.0-20.0%; the water-soluble fluorocarbon surfactant A2: 0.1-5.0%; the water-soluble quaternary ammonium salt clay stabilizer A3: 0.1-20.0%; the water-soluble dispersant A4: 0.1-10.0%; the water-soluble radical initiator A5: 0.000001-0.100%; the inorganic salt A6: 15.0-40.0%; the water A7: remainder.

2. The multi-functional slick water concentrate as described in claim 1, wherein the water-soluble monomer A1 is selected from a group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyl diallyl ammonium chloride, [2-(methacryloyloxy)ethyl] trimethylammonium chloride, [2-(acryloyloxy)ethyl]trimethylammonium chloride; (3-acrylamidopropyl)trimethylammonium chloride, [3-(methacryloylamino)propyl] trimethylammonium chloride, acryloxyethyldimethylbenzyl ammonium chloride, methacryloxyethyldimethylbenzyl ammonium chloride, acrylic acid, sodium acrylate, potassium acrylate, methacrylic acid, sodium methacrylate, potassium methacrylate, 2-acrylamido-2-methylpropanesulfonic acid, 2-acrylamido-2-methylpropane sulfonate sodium salt, 2-acrylamido-2-methyl propane sulfonic acid potassium salt and any combination thereof at any weight ratio.

3. The multi-functional slick water concentrate as described in claim 1, wherein the fluorocarbon surfactant A2 is selected from a group consisting of water-soluble anionic fluorocarbon surfactants, water-soluble cationic fluorocarbon surfactant, water-soluble nonionic fluorocarbon surfactant, water-soluble zwitterionic fluorocarbon surfactant, and water-soluble Gemini fluorocarbon surfactant, including perfluorooctanoic acid, lithium perfluorooctanate, sodium perfluorooctanate, potassium perfluorooctanate, ammonium perfluorooctanate, perfluorooctane sulfonic acid, lithium perfluorooctane sulfonate, sodium perfluorooctane sulfonate, potassium perfluorooctane sulfonate and any combination thereof at any weight ratio.

4. The multi-functional slick water concentrate as described in claim 1, wherein the quaternary ammonium salt A3 is selected from a group consisting of tetramethylammonium chloride, choline chloride, butyl trimethylammonium chloride, octyl trimethyl ammonium chloride, dodecyl trimethyl ammonium chloride, cetyl trimethyl ammonium chloride, poly(dimethyl diallyl ammonium chloride) and any combination thereof at any weight ratio.

5. The multi-functional slick water concentrate as described in claim 1, wherein the water-soluble dispersant A4 is selected from a group consisting of poly{[2-(methacryloyloxy)ethyl]trimethylammonium chloride}, poly{[2-(acryloyloxy)ethyl]trimethylammonium chloride}, poly(vinyl benzyl trimethyl ammonium chloride), poly(dimethyl diallyl ammonium chloride), hydrolyzed polyacrylamide, hydrolyzed polyvinyl acetate and any combination thereof at any weight ratio.

6. The multi-functional slick water concentrate as described in claim 1, wherein the water-soluble free radical initiator A5 is selected from a group consisting of ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, 4,4'-azobis(4-cyanovaleric acid) and any combination thereof at any weight ratio.

7. The multi-functional slick water concentrate as described in claim 1, wherein the inorganic salt A6 is selected from a group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, zinc sulfide and any combination thereof at any weight ratio.

8. The multi-functional slick water concentrate as described in claim 1, wherein the multi-functional slick water concentrate may be introduced, prior to the dispersion polymerization, with a mutual solvent A8 and a hydrophobic monomer A9, or with a mutual solvent A8 and a fluorocarbon-containing monomer A10; wherein the resultant drag reducing macromolecules, after the dispersion polymerization, is hydrophobic or fluorocarbon-modified; wherein the mutual solvent A8 is one or more of the mutual solvents selected from a group consisting of mutual solvents including ethylene glycol monobutyl ether, dimethyl formamide, and alcohol derivatives, aldehyde derivatives, ketone derivatives, ether derivatives other derivatives of dimethyl sulfoxide and any combination thereof at any weight ratio; wherein the hydrophobic monomer A9 is one or more of hydrophobic monomers selected from a group consisting of hydrophobic monomers comprising methyl acrylate, methyl methacrylate, ethyl acrylate, ethyl methacrylate, propyl acrylate, propyl methacrylate, butyl acrylate, butyl methacrylate, styrene and any combination thereof at any weight ratio; wherein the fluorocarbon monomer A10 is one or more of the fluorocarbon monomers selected from a group consisting of fluorocarbon monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, perfluorodecyl acrylate and any combination thereof at any weight ratio.

* * * * *